United States Patent [19]

Hinden

[11] Patent Number: 4,482,795

[45] Date of Patent: Nov. 13, 1984

[54] LONGITUDINAL FINNED RESISTANCE WELD PIN

[76] Inventor: Milton Hinden, Rte. #110, Farmingale, N.Y. 11735

[21] Appl. No.: 550,819

[22] Filed: Nov. 14, 1983

Related U.S. Application Data

[63] Continuation-in-part of Ser. No. 312,527, Oct. 19, 1981, Pat. No. 4,429,209.

[51] Int. Cl.$^3$ .............................................. B23K 9/20
[52] U.S. Cl. ...................................... 219/98; 411/452
[58] Field of Search ................... 219/98, 99; 411/452, 411/453

[56] References Cited

U.S. PATENT DOCUMENTS

| | | | |
|---|---|---|---|
| 1,978,145 | 10/1934 | Rosenberg | 411/452 |
| 2,223,871 | 12/1940 | Johnson | 411/453 |
| 3,624,340 | 11/1971 | Hinden | 219/99 |

Primary Examiner—Roy N. Envall, Jr.
Assistant Examiner—Alfred S. Keve
Attorney, Agent, or Firm—Mark T. Basseches; Paula T. Basseches

[57] ABSTRACT

An improved resistance weld pin is disclosed, the pin being especially adapted to hold insulation batts to the surfaces of ducts. The pin is characterized by the provision of axially directed heat radiating ribs which terminate at and extend radially beyond the junction of the tip of the pin and the shank.

5 Claims, 5 Drawing Figures

LONGITUDINAL FINNED RESISTANCE WELD PIN

This application is a continuation in part of my application Ser. No. 312,527, filed Oct. 19, 1981 entitled RESISTANCE WELDING PIN, now U.S. Pat. No. 4,429,209.

BACKGROUND OF THE INVENTION

1. Field of the Invention

The present invention is in the field of resistance weld pins intended specifically to be used for the attachment of batts or sheets of fibrous insulation to the interior surfaces of air ducts to be used in air conditioning and heating installations.

2. The Prior Art

It is known to improve the energy efficiency of air conditioning and heating installations by applying to the interior portions of metal ducting batts or sheets of fibrous insulating material, generally one to two inches thick. Typically, an adhesive is employed to connect the insulation to the duct and, to assure permanence of attachment, a multiplicity of nail-like metallic members are passed through the insulation materials, the tip portions of the nails being connected to the metal ducting.

Initially metallic devices in the nature of impact fasteners were employed for this purpose. Such fasteners are intended to bite into the metal of the duct without puncturing the same. Experience has shown, however, that the vibrational forces to which ducts are subjected in many cases rupture the bond between fasteners and duct.

More recently, the art has shifted to the use of welded fasteners wherein a pin having an enlarged head and sharpened tip is passed through the fibrous material and a resistance weld effected by passing a current through the length of the pin while the duct is connected to a ground electrode and the head of the pin to a live electrode.

Since a large number of pins are typically applied to a given length of ducting, resort has been made to automatic welding machines which store a multiplicity of pins in a hopper or like orienting device and feed the same to a welding head. The operator need merely position the head and trigger an activating device, following which the welding cycle is automatically completed by progressively advancing a pin through the batt until the tip engages the duct. Continuing downward pressure against the pin head while melting current is passed through the pin results in melting of the tip and attachment of the pin.

A suitable welding pin is disclosed in my U.S. Pat. No. 3,624,340 of Nov. 30, 1971. Apparatus for automatically attaching such pins is shown in my U.S. Pat. No. 3,835,285 of Sept. 10, 1974 and U.S. Pat. No. 3,858,024 of Dec. 31, 1974, issued to myself and Charles Giannone, as well as in pending application Ser. No. 367,247, filed Apr. 12, 1982.

While the pins and attachment devices of the above referenced patents and application have achieved substantial commercial success, it has been determined that the economy and performance thereof can be improved through the use of a welding pin as hereinafter described and claimed.

More specifically, the welding pins employed heretofore have included an elongate shank having a smooth cylindrical exterior, headed at one end and sharpened at the other. The headed end of the pin has typically been enlarged either integrally or with a separate apertured disk at the under-junction of the head and shank to afford a large contact area with the surface of the relatively fragile insulating material which is usually fabricated of glass fibers. The tip end of the pin is sharpened so as to facilitate penetration through the fibers and provide secure electrical contact with the metal duct.

Since a given installation will include many hundreds or thousands of welding pins, the cost of the pins is a factor to be considered.

The pins heretofore used have employed relatively thick shank portions, in the area of 0.15". As noted in U.S. Pat. No. 3,624,340, the tip angle is pertinent to the effectiveness of the welding procedure. If the tip angle is too acute, the weld may not result in the thickest portion of the shank abutting the surface of the metal duct, with the resultant loss of stability of the attached pin as against side forces exerted thereagainst. If the angle is too obtuse, the tip may not adequately penetrate the fiber mass, and even if such penetration is achieved, due to the relatively low resistance of the tip portion resulting from its thick cross section, rapid melt may not be achieved.

Importantly, as noted hereinabove, it has been found necessary in order to provide both the necessary tip angle and current carrying capacity, to form the welding pins with relatively thick shanks even though the strength of the shank, after attachment, is not a factor in the final installation.

Attempts to effect economies through the use of significantly smaller diameter pins, with obvious attendant savings in metal costs, have proved unsatisfactory since such thinner shanks tend to overheat in the course of welding. Where such shanks overheat, the pin body tends to bow or skew due to softening of the metal, whereby the requisite pressures of tip against duct throughout the short cycle of the welding apparatus are not developed.

In the parent application above referred to, a welding pin has been provided which comprises a relatively thin cylindrical core surrounded by a series of axially spaced annular projections. A pin of the noted sort, in addition to being less expensive than thicker cylindrical shank pins, has unexpectedly been found to be subject to effective attachment with the expenditure of lower welding energy, providing equal or superior adhesion to the duct and exhibiting a substantially lesser tendency to burn or damage the shank adjacent portions of the insulation materials.

As noted in the parent application, the effectiveness of the welding pin is considered to reside in the fact that the annular projections act in the manner of heat radiating fins. With such device it is possible to utilize lesser amounts of metal in the pin while obtaining equivalent or superior attachment of the pin to the duct and, as noted, with minimal damage to the duct material.

SUMMARY OF THE INVENTION

The present invention may be summarized as directed to a further improved welding pin possessing all of the desirable characteristics of the pin of said parent application plus additional advantages.

More particularly, the pin of the present invention may be more readily handled by automatic feed devices. Additionally and importantly, the pin provides a depth control of the quantity of the pin which is melted in the course of the weld such that the pins are automatically inserted to a predetermined position with the head spaced a desired distance from the duct.

Additionally, the attached pin is stabilized against forces tending laterally to deflect the pin.

More specifically, the pin of the present invention includes a plurality of axially directed ribs extending from a point at or adjacent the head to the junction of the major diameter of the tip of the pin and the shank thereof. The minor diameter of the shank is equal to the major diameter of the conical tip at the junction with the shank, and the ribs project a radial distance beyond such diameter.

The lowermost ends of the ribs are disposed at a heightwise location essentially coincident with the uppermost end of the tip and such lowermost rib ends define a stop shoulder. By this means there is created in the area directly above the tip a pin length of decreased electrical resistance and a stop shoulder.

In use, the pin tip melts beginning at the point due to its high resistance, whereby the voltage drop is maximized in the tip area. Immediately as the lowermost ends of the ribs enter the molten weld pool, the resistance is decreased and the welding action stopped. The lower ends of the ribs, in effect, provide a widened or broadened base, thus providing additional stability against lateral forces exerted against the pin.

Accordingly, it is an object of the invention to provide an improved weld pin device.

A further object of the invention is to provide a weld pin device wherein the total quantum of metal in the shank is reduced and yet the weld pin is not subject to overheating.

Still a further object of the invention is the provision of a pin of the type described which may be readily fed by automated pin feed mechanisms and which provides a high degree of control for depthwise feed.

To attain these objects and such further objects as may appear herein or be hereinafter pointed out, reference is made to the accompanying drawings, forming a part hereof, in which.

Figure 1:
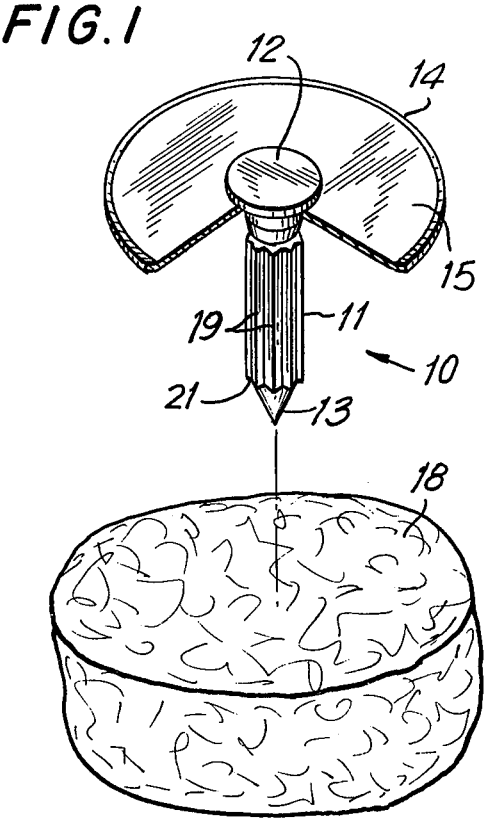
FIG. 1 is an exploded perspective view of a weld pin and fragmentary portions of an insulation batt and a duct metal substrate.
Figure 2:
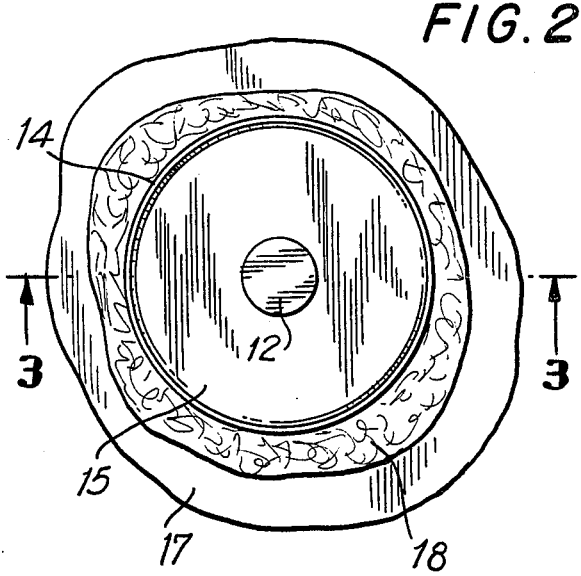
FIG. 2 is a top plan view of an attached weld pin in accordance with the invention.

Turning now to the drawings, there is shown in FIG. 1 a resistance weld pin 10 comprising a shank portion 11 and an integral head 12.

At the lower end of the shank portion there is formed a tip 13 preferably in the form of a right circular cone. An enlarged washer member 14 is mounted with the upper surface 15 of the washer adjacent undersurface 16 of the head.

Figure 3:
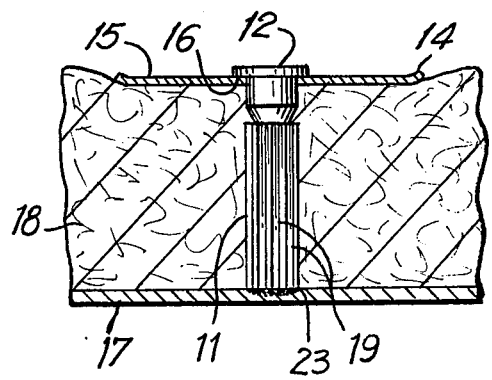
FIG. 3 is a section taken on the line 3—3 of FIG. 2.
Figure 4:
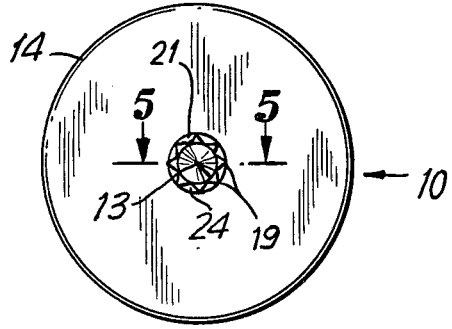
FIG. 4 is a bottom plan view of a weld pin in accordance with the invention.

In FIGS. 1 and 3 there is shown a duct member 17 and an increment of fibrous batting or insulation material 18.

A characterizing feature of the present invention resides in the provision of a plurality of ribs 19 which project radially from the minor diameter 20 of the shank 11 of the pin 10.

Figure 5:
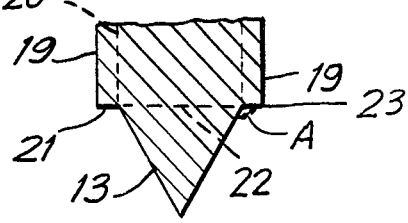
FIG. 5 is a magnified fragmentary section taken on the line 5—5 of FIG. 4.

As best seen in FIG. 5, the lowermost ends 21 of the ribs 19 terminate at a point along the length of the shank which is coincident with the junction line 22 of the major diameter of the conical tip 13 with the minor diameter of the pin shank 11 (the minor diameter being that portion of the shank not constituting part of the ribs.)

The lowermost ends 21 of the ribs 19 define a stop shoulder 23. Illustratively, the included angle in the conical tip 13 is from about 35° to 55° and the angle A—see FIG. 5—between the lowermost ends 21 and the sides of the conical tip 13 is greater than 90° and less than 180°, being preferably in the range of from about 120° to 160°.

While in the ideal condition the lowermost ends 21 are disposed, as illustrated, at right angles to the longitudinal axis of the pin, it is impracticable from a manufacturing standpoint economically to fabricate weld pin devices of such extremely close tolerance in view of the large number of pins which are employed, and the low cost at which they must be sold.

It is important to note that the lowermost ends 21 should define a stop shoulder rather than merging with and merely forming a continuation of the side surfaces of the tip 13.

Preferably each rib should project a radial distance of at least about 10% of the minor diameter of the shank.

As will be noted from the foregoing, the spaces 24 between the ribs define vertically directed channels. These channels are useful in permitting the heat of weld to be vented along with weld gases in a direction axially of the shank. This is in contrast to the parent application which employs a series of annular fins, thereby defining in substance cells surrounding the pin, each of the cells being axially displaced from the others.

In practice, the manner of attachment of the pins is essentially as set forth in U.S. Pat. No. 3,624,340 and the other patents hereinabove cited. More particularly, when it is desired to secure a pin to substrate 17, a welding electrode (not shown) is pressed downwardly against the upper surface of head 12, forcing the tip 13 of the pin through the insulation batt 18 and into contact with the upper surface of substrate 17. The opposite surface of the substrate 17 rests on a grounded electrode and, hence, when a welding current is passed through the head, shank and tip of the pin for a predetermined short period of time while pressure is continuously applied by the live electrode, the pin tip and portions of the substrate adjacent the tip are caused by the current flow to melt and interfuse—see FIG. 3.

Desirably, the melting is restricted to the tip of the pin and such effect is achieved in part since the tip components provide the highest electrical resistance and, thus, the greatest voltage drop and heating effects are maximized at the tip.

In the pin of the present invention, the existence of the axially extending ribs tends to reduce the resistance in the major shank area and aid in restricting the major voltage drop and, hence, major heat generated, to the tip.

A further desirable aspect of the present weld pin resides in the fact that as soon as the lowermost ends 21 of the ribs enter the melt pool or engage against the duct surface 17, resistance is significantly reduced, to interrupt or impede further melting. It is thus assured that the pin will not melt below the low resistance area defined by the lower limits of the ribs. In this manner the pin of the present invention avoids the dimpling effect which is occasionally observed when melting action progresses to a point along the shank beyond that which is desired, with resultant shortening of the pin.

The presence of a plurality of ribs 19 materially increases the dissipation of heat along the shank and maintains the voltage drop along the relatively cool shank at a minimum, maximizing the voltage drop across the heated high resistance area of the tip.

The heat dissipating action of the axial ribs is even more effective than that of the annular ribs or fins of the parent application. Thus, the damage to the pin adjacent portions of the insulation is minimized.

Due to the presence of the heat radiating ribs or fins 19, it is possible to utilize a lesser amount of metal in the pin shank without loss of attaching power.

The terms "axial" or "longitudinally extending" as used in respect of the ribs are not to be taken as limited to a condition in which the ribs are strictly parallel to the axis of the pin but, rather, the benefits of such ribs are obtained even where the ribs are slightly offset from the pin axis.

The pin of the present invention has the further advantage that the longitudinally directed ribs do not interfere with the feeding or orienting of the pins by mechanical processing devices used to attach the same, as is occasionally the case with the annular finned pins of the parent application.

As noted, the lower ends 21 of the ribs typically butt against the duct 17 in the attached position or at least enter into the melt pool. Thus, the stability of the pin against forces applied normal to the longitudinal axis is augmented by the spread contact area of the ribs.

As will be apparent to those skilled in the art and familiarized with the instant disclosure, numerous variations may be made in the specific details of the illustrated embodiment without departing from the spirit of the invention and the same is thus to be broadly construed within the scope of the appended claims.

Having thus described the invention and illustrated its use, what is claimed as new and is desired to be secured by Letters Patent is:

1. A metallic welding pin for the attachment of insulated batts to a metallic duct substrate by resistance welding comprising, in combination, an axially elongate shank portion having a head at one end and a sharpened tip at the other end, said head having a planar uppermost contact surface, said tip being conical in configuration, a washer member of greater diameter than said head mounted over said shank and disposed at the junction of said head and shank, said shank including a plurality of generally axially directed ribs extending from a point adjacent said head to the junction of the major diameter of said tip with said shank, the minor diameter of said shank in the areas between said ribs corresponding substantially to the major diameter of said tip, the lowermost ends of said ribs, at their radial innermost ends merging with said minor diameter of said shank at a heightwise position substantially coincident with the junction of said tip and shank, the included angle between said lowermost ends and said tip being less than 180°.

2. A weld pin in accordance with claim 1 wherein said lowermost ends of said ribs define a stop shoulder.

3. A weld pin in accordance with claim 2 wherein the included angle between said lowermost ends and said tip is greater than 90° and less than 180°.

4. A welding pin in accordance with claim 1 wherein said tip comprises a right circular cone, and said included angle between said lowermost ends of said ribs and said tip is in the range of from about 120° to 160°.

5. A welding pin in accordance with claim 4 wherein the apex angle of said tip is in the range of from about 35° to 55°, and said lowermost ends are directed at an angle of substantially 90° relative to the axis of said pin.

* * * * *